United States Patent [19]

Iwasa et al.

[11] Patent Number: 5,265,377

[45] Date of Patent: Nov. 30, 1993

[54] GLASS RUN AND METHOD OF MANUFACTURING THE SAME

[75] Inventors: Tadanobu Iwasa; Masanori Aritake, both of Inazawa, Japan

[73] Assignee: Toyoda Gosei Co., Ltd., Japan

[21] Appl. No.: 892,794

[22] Filed: Jun. 3, 1992

[30] Foreign Application Priority Data

Jul. 7, 1991 [JP] Japan .................. 3-163710

[51] Int. Cl.$^5$ ............................ E06B 7/16
[52] U.S. Cl. ...................... 49/441; 49/490.1; 49/498.1; 156/244.25; 156/279
[58] Field of Search .......... 49/440, 441, 490, 491, 49/498; 428/31; 264/171, 177.1, 177.17; 156/244.25, 279

[56] References Cited

U.S. PATENT DOCUMENTS

| | | | |
|---|---|---|---|
| 2,021,972 | 11/1935 | Vogt | 49/440 |
| 2,594,717 | 4/1952 | Bailey . | |
| 3,018,525 | 1/1962 | Deisenroth | 49/441 |
| 3,131,439 | 5/1964 | Wilfert | 49/440 |
| 3,222,769 | 12/1965 | Le Plae | 49/490 |
| 3,290,826 | 12/1966 | Weimar | 49/440 |
| 3,585,099 | 6/1971 | Van Buskirk | 428/90 |
| 3,854,247 | 12/1974 | Stark et al. | 49/495 |
| 3,918,208 | 11/1975 | Fairchild . | |
| 4,246,303 | 1/1981 | Townsend | 428/31 |
| 4,643,923 | 2/1987 | Bernitz et al. | 49/490 |
| 4,923,759 | 5/1990 | Brooks et al. | 49/441 |
| 4,970,102 | 11/1990 | Guillon | 49/490 |

FOREIGN PATENT DOCUMENTS

| | | | |
|---|---|---|---|
| 2127097 | 12/1972 | Fed. Rep. of Germany | 49/441 |
| 745025 | 2/1956 | United Kingdom | 49/441 |
| 872850 | 7/1961 | United Kingdom | 49/440 |
| 942577 | 11/1963 | United Kingdom | 49/440 |

*Primary Examiner*—Peter M. Cuomo
*Assistant Examiner*—Michael J. Milano
*Attorney, Agent, or Firm*—Cushman, Darby & Cushman

[57] ABSTRACT

A glass run of the invention includes a furrow part on which a window glass moves and slides. The furrows of the furrow part are inclined at a predetermined angle with respect to the sliding direction of the window glass. When dirt or dust is deposited in between the window glass and the furrow part, it enters the furrows of the furrow part. The slanted configuration of the furrows of the furrow part, in combination with the sliding force of the window glass, moves dust or dirt along the furrows to a position where the dirt does not rub against the end face of the window glass. The structure of the invention keeps the window glass from undesirably rubbing dust or dirt, thus preventing an increase in sliding resistance and undesirable noise.

14 Claims, 7 Drawing Sheets

GLASS RUN AND METHOD OF MANUFACTURING THE SAME

BACKGROUND OF THE INVENTION

1. Field of the Invention

The present invention relates to a glass run for ensuring sufficient sealing as well as enhancing the slidability of window glass, and to a method of manufacturing the same.

2. Description of the Related Art

Figure 1:
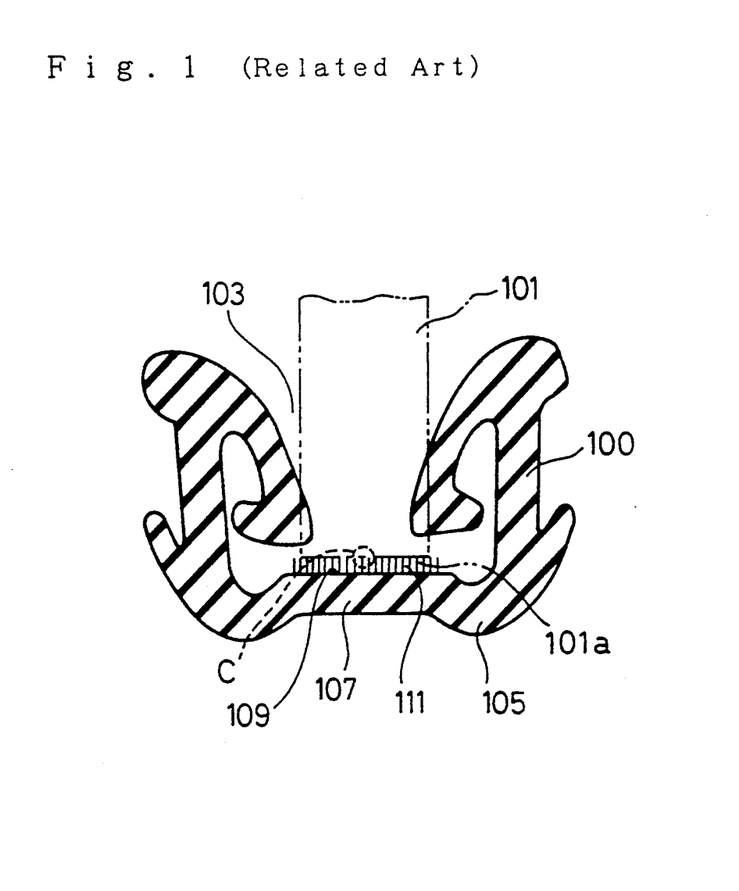
FIG. 1 is a cross sectional view showing an example of a glass run of the related art.

So-called glass runs are typically applied to the window frame of an automobile door. FIG. 1 is a cross sectional view showing an example of a glass run 100, which includes a solid rubber base 105 with a sliding groove 103 in which a door window glass 101 moves. A bottom part 107 of the base 105, that is, the foot of the groove 103, is provided with a sliding part 109 which allows the door window glass 101 to slide thereon. The sliding part 109 includes a flocked portion 111 formed by static flocking to ensure smooth sliding of the end face 101a of the door window glass 101.

The flocked portion 111 has flock spreading over the sliding part 109 in a substantially uniform manner. The flock of the portion 111, however, undesirably holds obstructive dirt or dust C, which enters the flocked portion 111 over time through daily use. Such dirt or dust C rubs against the end face 101a of the door window glass 101 thereby increasing sliding resistance and causes noise and removal of the flock, thus lowering the durability of the glass run 100.

U.S. Pat. No. 3,918,206 discloses another type of glass run which has an urethane layer of predetermined thickness formed on a sliding member formed by roller painting, rather than a flocked portion 111.

The surface of the urethane layer gradually becomes uneven, with repeated sliding of the door window glass, which allows undesirable accumulation of dirt or dust C as with the glass run 100 of the previously described example.

U.S. Pat. No. 2,594,717 discloses yet another type of glass run which includes a felt member adhered to a sliding member. This glass run has a problem similar to that of the glass run of U.S. Pat. No. 3,918,206.

SUMMARY OF THE INVENTION

An object of the present invention is to provide a glass run of sufficient durability, which ensures smooth sliding of a window glass even when dirt or dust is in between an end face of the window glass and a sliding part of the glass run.

The present invention is thus directed to a glass run for automobiles comprising: a base; and a furrow part formed on a part of the base on which a door window glass moves, and whose furrows are inclined at a predetermined angle against the sliding direction of the door window glass.

According to an aspect of the present invention, the predetermined angle of the furrow part ranges from about twenty degrees to sixty degrees.

According to another aspect of the present invention, a pitch of the furrows ranges from about 1 to 2 millimeters.

According to a preferred embodiment, the base is substantially of a U-shape in which the end face of the window glass moves; and the furrow part is accompanied by a gutter running in the sliding direction of the door window glass.

According to another preferred embodiment, the material of the furrow part is different from the material of the base, which is made of EPDM rubber. Most preferably, and the furrow part comprises a polyester fabric and the furrow part is fixed to the base by melting and re-solidifying a film inserted between the base and the furrow part.

The present invention is further directed to a method of forming a glass run, comprising the steps of: (a) extrusion-forming a base of the glass run and; (b) forming a furrow part on a part of the base of the glass run, furrows of the furrow part being inclined at a predetermined angle against the sliding direction of the door window glass.

According to another aspect of the present invention, the step (b) comprises the steps of: preparing a sliding member having the furrow part; and fixing the sliding member to the base with adhesive.

The glass run of the present invention has a furrow part on which a window glass slides. The furrow part is inclined at a predetermined angle against the sliding direction of the window glass.

When dirt or dust is deposited in between the window glass and the furrow part, it enters the furrow part. The furrow part is, however, inclined with respect to the sliding direction of the window glass as mentioned above. This configuration of the furrow part, in combination with the sliding force of the window glass, moves dust or dirt along the furrows thereof to a position where the dirt does not rub against the window glass. Thus, the structure of the present invention keeps the end face of the window glass from undesirably rubbing against dust or dirt, thus preventing an increase in the sliding resistance and unpleasant noise.

The above and further objectives and features of the invention will be more fully apparent from the following detailed description with accompanying drawings.

DESCRIPTION OF THE PREFERRED EMBODIMENT

Figure 2:
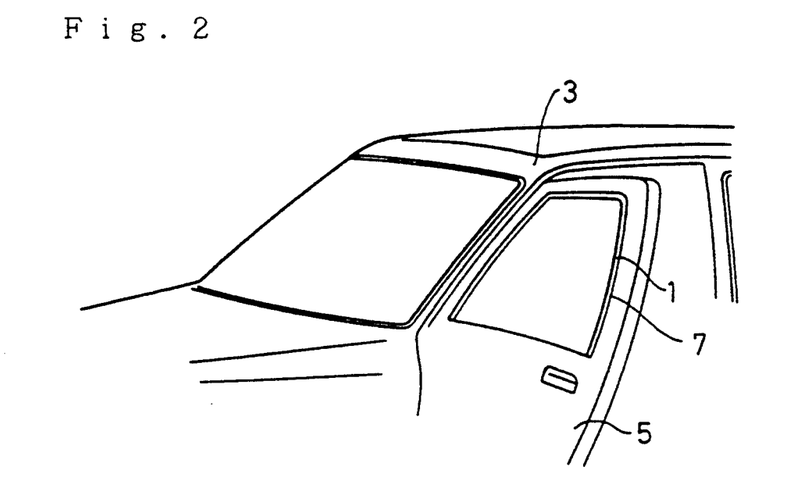
FIG. 2 is a view showing the outside structure of an automobile.
Figure 3:
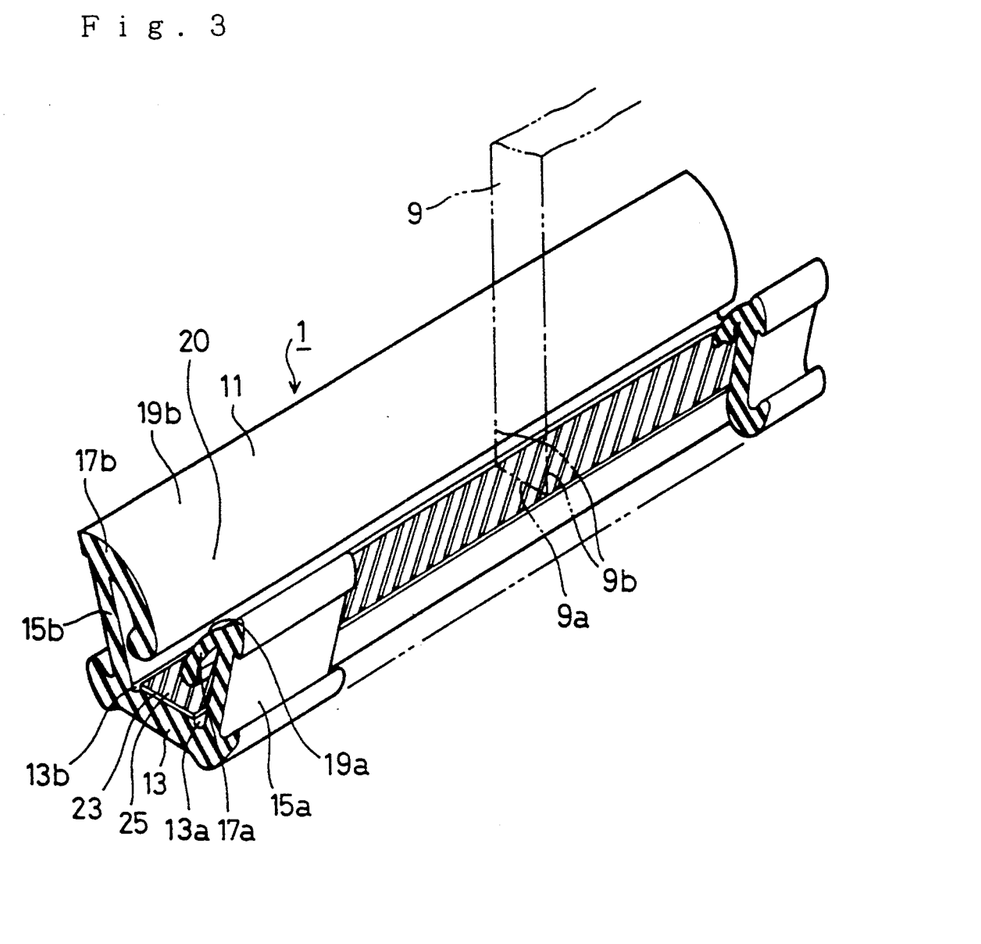
FIG. 3 is a partly broken perspective view illustrating a glass run embodying the present invention.

FIG. 2 is a view of an automobile. A glass run 1 is applied to a window frame 7 of a door 5 of an automobile body 3. FIG. 3 is a partly cutaway perspective view of the glass run 1, and FIG. 4 is a cross sectional view of the glass run 1 before it is fixed in the window frame 7.

Figure 4:
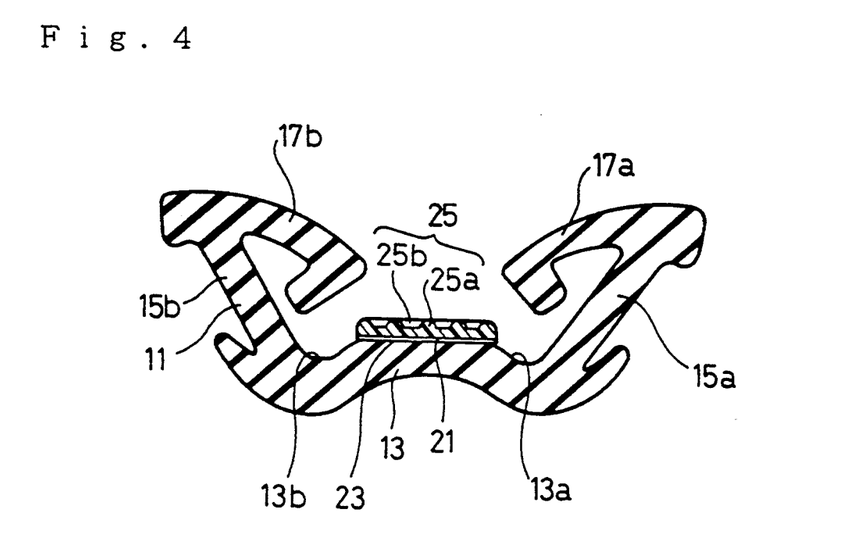
FIG. 4 is a cross sectional view showing the glass run of FIG. 3.

The glass run 1 has an EPDM (ethylene-propylene non-conjugated diene copolymer) rubber base 11 as shown in FIGS. 3 and 4. The rubber base 11 includes: a bottom part 13; side parts 15a and 15b which project upward from both side edges of the bottom part 13; and lips 17a and 17b which respectively extend inwardly from the top edges of the side parts 15a and 15b. The lips 17a and 17b contact side faces 9b, 9b of a door window glass 9. The rubber base 11 further includes a sliding groove 20 surrounded by the bottom part 13, the side parts 15a and 15b, and the lips 17a and 17b.

The lips 17a and 17b respectively have urethane coated sliding layers 19a and 19b, as shown in FIG. 3, which are directly in contact with the side faces 9b, 9b of the door window glass 9 to allow the same to move smoothly.

The bottom part 13 is provided with: a sliding member 23 adhered thereto via a laminated film 21 (see FIG. 4); and gutters 13a and 13b formed on both sides of the sliding member 23.

Figure 5:
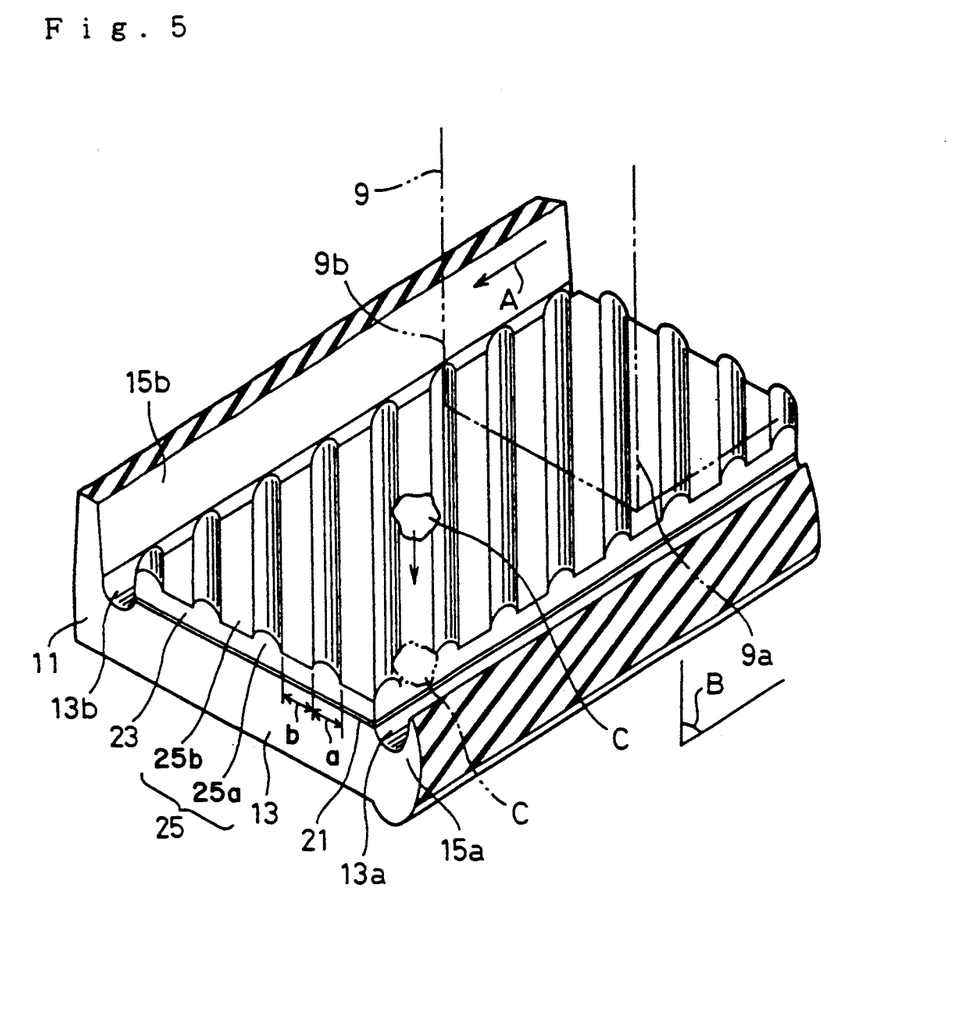
FIG. 5 is an explanatory view illustrating a sliding member of the glass run of the invention in use.

The sliding member 23 is a polyester fabric and has a furrow part 25 consisting of a number of ridges 25a and furrows 25b formed alternately and in parallel with one another and in communication with gutter 13a and 13b, as shown in FIG. 5. The ridges 25a and the furrows 25b are inclined at a predetermined acute angle B, for example, approximately twenty degrees, with respect to a sliding direction A of the door window glass 9. The furrow part 25 is, for example, formed by twilling, that is, a twill weave made by floating the weft or the warp threads over groups of two or more threads or thicker threads and staggering these floats regularly.

The furrow part 25 can have another structure suitable for removal of dirt or dust C. The angle B of the ridges 25a and the furrows 25b is preferably from about 20 to about 60 degrees; and the preferred width of the ridges 25a and the furrows 25b is between about 0.5 and 1 mm, respectively. In other words, the pitch of the ridges and furrows is preferable between about 1 and 2 mm.

The laminated film 21, which secures the sliding member 23 to the EPDM rubber base 11, includes a first film favorably adhering to the EPDM rubber base 11, and a second film favorably adhering to the polyester sliding member 23. In this embodiment, the first layer is a 50 micrometer thick, olefin resin sold under the trademark of ADMER by Mitsui Petrochemical Industries, Ltd., and the second film is a 30 micrometer thick, copolymerized polyester resin sold under the trademark of CHEMIT R-248 by Toray Industries, Inc. The laminated film 21 is prepared by co-extrusion of the first and second films.

The door window glass 9, when activated by a driving mechanism (not shown), slides in the sliding groove 20 of the glass run 1 (FIG. 3).

The lips 17a and 17b of the glass run 1 seal the 25 side faces 9b, 9b of the door window glass 9. The sliding layers 19a and 19b on the lips 17a and 17b, in combination with the sliding member 23, efficiently enhance slidability of the door window glass 9.

The furrow part 25 with the ridges 25a and the furrows 25b (FIG. 5), formed on the surface of the sliding member 23, is inclined at the predetermined angle B against the sliding direction A of the door window glass 9. When dirt or dust C is deposited in between the end face 9a of the door window glass 9 and the sliding member 23, it enters the furrows 25b of the furrow part 25. The structure of the furrow part 25, in combination with the sliding force of the door window glass 9, moves the dust or dirt C along the furrows 25b of the furrow part 25 to a position near the gutter 13a where the dirt does not rub against the end face 9a of the door window glass 9.

The structure of the invention efficiently prevents an undesirable increase in the sliding resistance and unpleasant noise due to dirt or dust C which is deposited in between the door window glass 9 and the sliding member 23. This structure also keeps the sliding member 23 from the distinctive forces of rubbing dust or dirt C, that is, from early abrasion, thus enhancing the durability of the glass run 1.

During motion of the door window glass 9, the end face 9a of the door window glass 9 contacts only the ridges 25a of the furrow part 25 of the sliding member 23, but not with the furrows 25b. Thus, the glass run 1 of the invention has a smaller contact area than conventional glass runs, in which the entire sliding member is in contact with the door window glass. This reduces the sliding resistance of the door window glass 9 to ensure smooth sliding.

Figure 6:
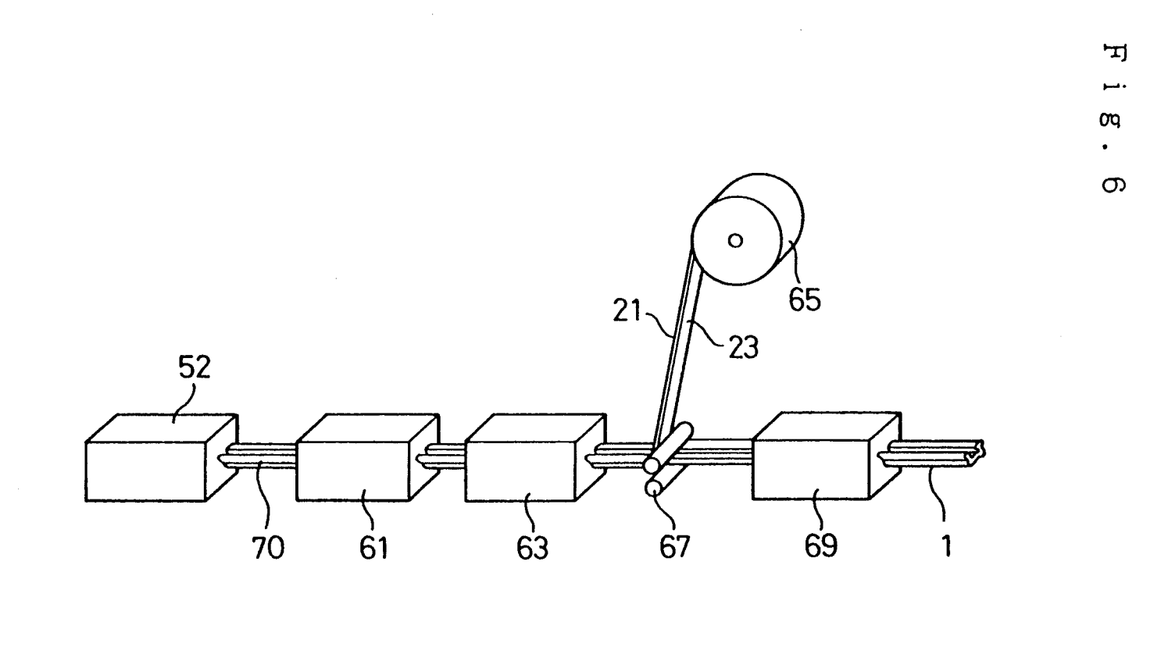
FIG. 6 is an explanatory view showing manufacture of the glass run.

FIG. 6 illustrates a production line used in manufacturing the glass run 1.

Figure 7:
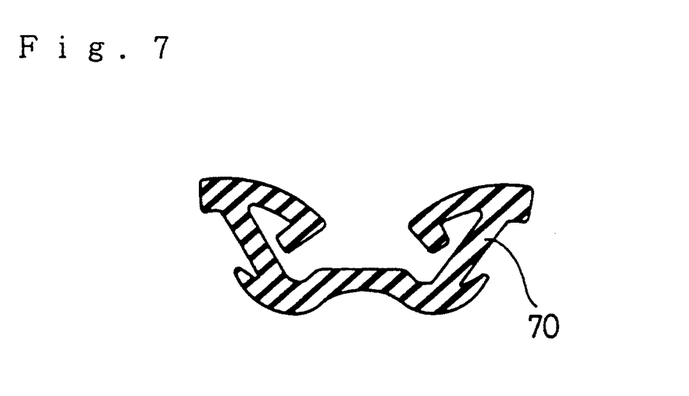
FIG. 7 is a cross sectional view illustrating a body of a glass run formed by extrusion forming in accordance with the manufacture process.

First, an extruded body 70 shown in FIG. 7 is formed by extruding an unvulcanized EPDM rubber material with an extruder 52 from a cylinder 54 at a speed of about 5 m/minutes. The extruded body 70 is vulcanized at a temperature of 200° C. for about five minutes while passing through an microwave heater 61 and a hot blast heater 63.

In the subsequent adhesion process, the sliding member 23 with the laminated film 21 is fed out of a roller 65 and pressed onto the bottom part 13 of the extruded body 70 with a pressure roller 67 while making use of the residual heat of the extruded body 70 following after vulcanization. The sliding member 23 includes the furrow part 25 with a twill weave on the surface thereof, and is stuck to the laminated film 21 through application of heat. The sliding member 23 can be composed of any material with small sliding resistance such as nylon, polyethylene, and fluororesin other than the polyester of the specifically disclosed embodiment.

The extruded body 70 is cooled with a cooling unit 69, and the lips 17a and 17b are coated with urethane material by using a roller (not shown), whereby the glass run 1 of the invention is completed.

The glass run 1 thus manufactured has the favorable effects described above, for example, preventing an increase in the sliding resistance due to dirt or dust.

Other embodiments of the invention are described briefly below.

(1) The sliding member 21 with the twill weave can be replaced by a resin plate which is composed of material with excellent slidability, such as nylon, and having a furrow part with ridges and furrows on the surface thereof. The resin plate may be fixed on the bottom part of a rubber base with adhesive. This type of glass run has similar effects to the glass run 1 in the above embodiment.

Figure 8:
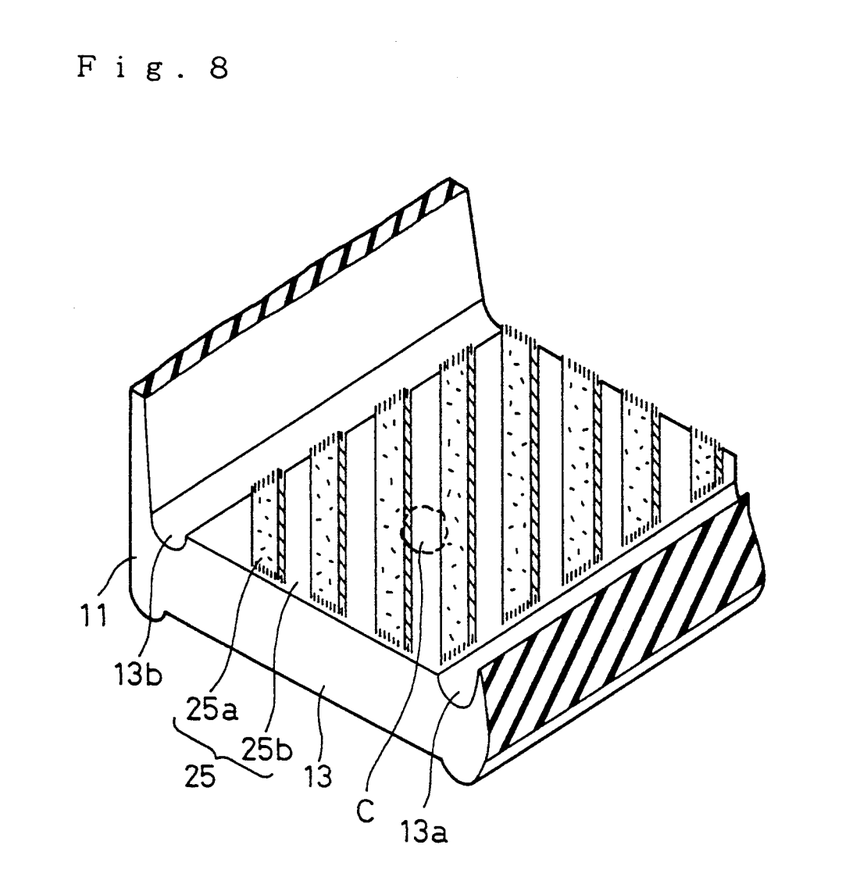
FIG. 8 is a partly broken perspective view illustrating a glass run of another embodiment, which includes a flocked furrow part.

(2) The furrow part can be made by applying adhesive in a striped pattern on a flat surface of the sliding part, and by flocking the stripes to form ridges 25a. FIG. 8 shows the furrow part thus formed.

Figure 9:
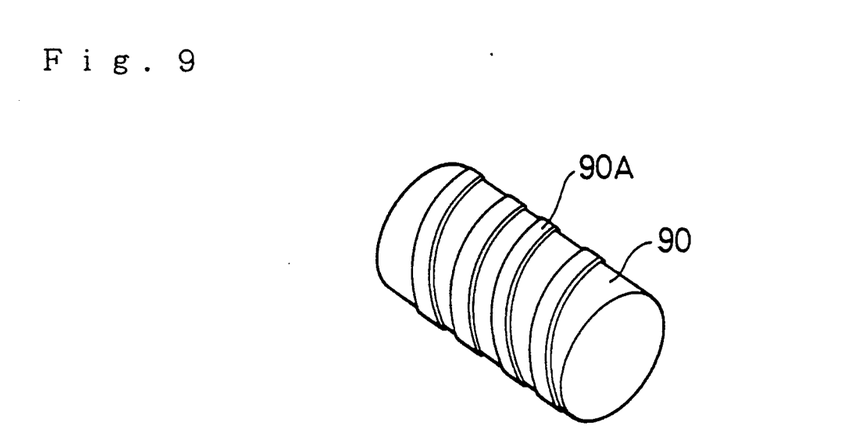
FIG. 9 is a perspective view showing a transfer roller used in manufacture of a glass run of still another embodiment.

(3) The furrow part can be also formed by extruding a resin base, for example of PVC (polyvinyl chloride), and by pressing a transfer roller 90 shown in FIG. 9 on the hot and soft resin base; the ridges 90A of the transfer roller 90 thus form furrows on the resin base.

(4) In the above embodiments, the furrow part is formed on the bottom face of the sliding groove. It can be formed on the surface of the lips 17a and 17b which directly contact the door window glass.

Figure 10:
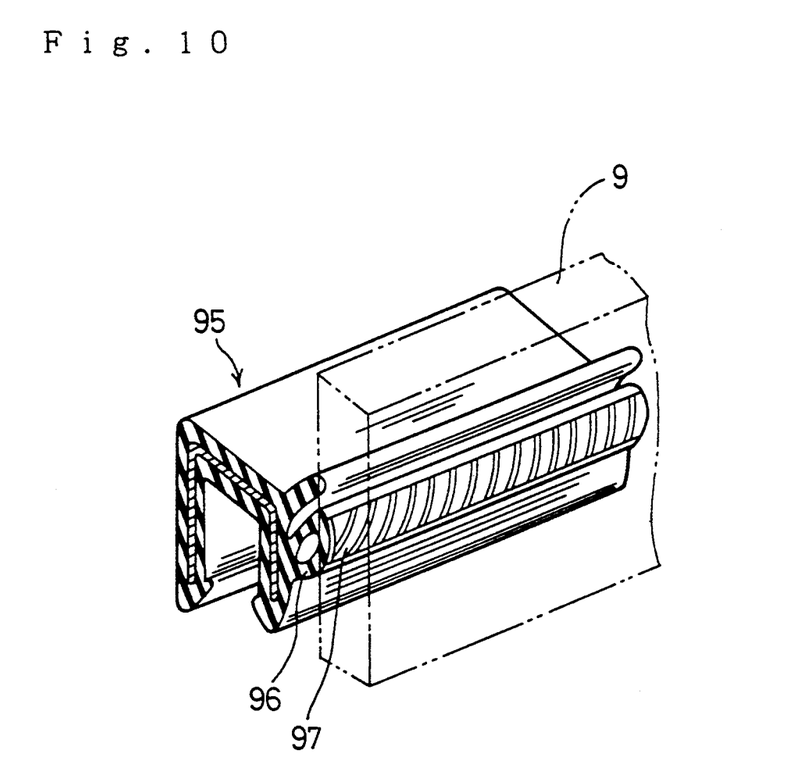
FIG. 10 is a partly broken perspective view illustrating a substantially F-shaped glass run of yet another embodiment.

(5) The glass run of the above embodiment has a substantially U-shaped cross section and is attached to a window frame of a door. The structure of the invention is, however, also applicable to a substantially F-shaped glass run 95 as shown in FIG. 10, which is mounted near, on a belt line of the automobile door, and has a lip 96 sliding on a side face of a door window glass 9. In this embodiment, a furrow part 97 with ridges and furrows is formed on the sliding face of the lip 96.

As the invention may be embodied in other forms without departing from the spirit of essential characteristics thereof, the embodiments above are illustrative and not restrictive. The scope of the invention is defined by the appended claims rather than by the description preceding them, and all modifications and alternative configurations that fall within the metes and bounds of the claims and equivalents thereof are therefore embraced by the claims.

What is claimed is:

1. A glass run for automobiles comprising:
   a substantially U-shaped base having a bottom part and side parts, for accommodating an end face of a movable door window glass;
   a furrow part formed on said bottom part for slidably engaging said door window glass, said furrow part having transverse furrows inclined at a predetermined acute angle with respect to a sliding direction of the door window glass and extending respectively in parallel with each other; and
   gutters extending in said sliding direction of said door window glass on both sides of said furrow part and in communication with said furrows.

2. A glass run in accordance with claim 1, wherein said predetermined angle of said furrows is from about twenty degrees to about sixty degrees.

3. A glass run in accordance with claim 2, wherein a pitch of said furrows is from about 1 to about 2 millimeters.

4. A glass run in accordance with claim 2, wherein said furrow part is a flocked part which is flocked in a stripe pattern.

5. A glass run in accordance with claim 1, wherein a material of said furrow part is different from a material of said base.

6. A glass run in accordance with claim 5, wherein said furrow part is formed from a polyester fabric.

7. A glass run in accordance with claim 6, wherein said base is made of EPDM rubber and said furrow part is fixed to said base by melting and re-solidifying a film disposed between said base and said furrow part.

8. A glass run in accordance with claim 5, wherein said furrow part formed from a resin.

9. A method of forming a glass run for automobiles, comprising the steps of:
   (a) extrusion-forming a substantially U-shaped base having a bottom part and side parts for accommodating an end face of a movable window;
   (b) preparing a furrow part having a longitudinal direction and transverse furrows inclined at a predetermined angle acute with respect to said longitudinal direction of said furrow part; and
   (c) fixing said furrow part to said bottom part with an adhesive film, said furrow part being fixed to said bottom part by melting and re-solidifying said film, thereby fixing said furrows inclined at said predetermined acute angle with respect to a sliding direction of said door window glass and extending respectively in parallel with each other.

10. A method according to claim 7, wherein said step (b) comprises the step of:
    pressing a transfer roller having ridges onto said base immediately after said step of extrusion-forming of said base, to thereby form furrows on said base.

11. A method according to claim 10, wherein said step (b) comprises the steps of:
    applying adhesive in a striped manner on a part of said base; and
    flocking said part of said base having applied with said adhesive.

12. A glass run for automobiles comprising:
    a base; and
    a furrow part formed on a part of the base which slidably engages a door window glass, said furrow part having furrows inclined at a predetermined angle with respect to a sliding direction of the door window glass, said predetermined angle of said furrows being from about twenty degrees to about sixty degrees, said furrows being a flocked part which is flocked in a stripe pattern.

13. A method of forming a glass run for automobiles, comprising the steps of:
    (a) extrusion-forming a base of the glass run and;
    (b) forming a furrow part having furrows on a part of said base of the glass run, said furrows of said furrow part being inclined at a predetermined acute angle with respect to a sliding direction of said door window glass, by the step of pressing a transfer roller having ridges onto said base immediately after said step of extrusion-forming of said base, to thereby form furrows on said base.

14. A method of forming a glass run for automobiles, comprising the steps of:
    (a) extrusion-forming a base of the glass run and;
    (b) forming a furrow part having furrows on a part of said base of the glass run, said furrows of said furrow part being inclined at a predetermined angle with respect to a sliding direction of said door window glass, by the step of applying adhesive in a striped manner on a part of said base, and flocking said part of said base having said applied adhesive.

* * * * *